UNITED STATES PATENT OFFICE.

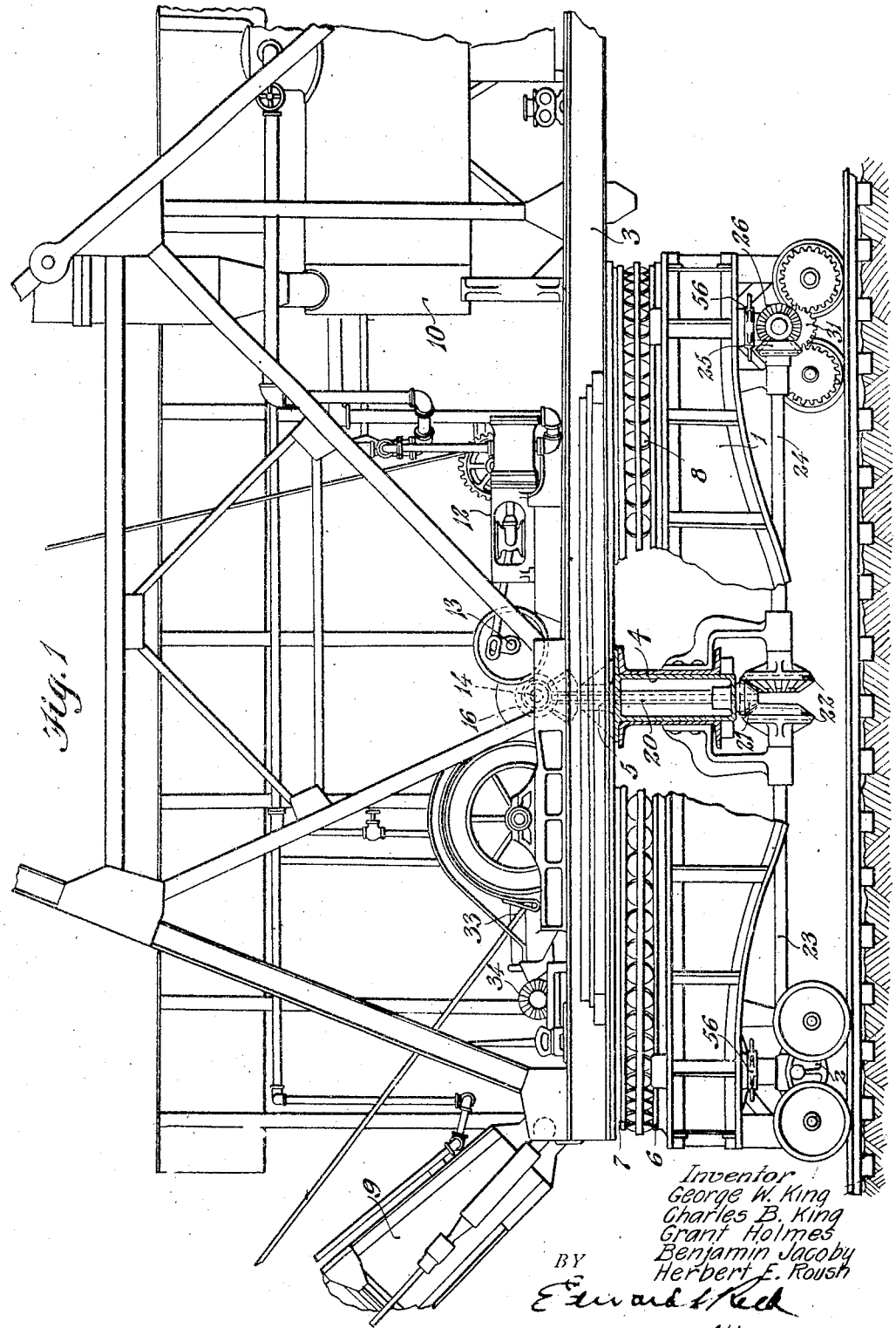

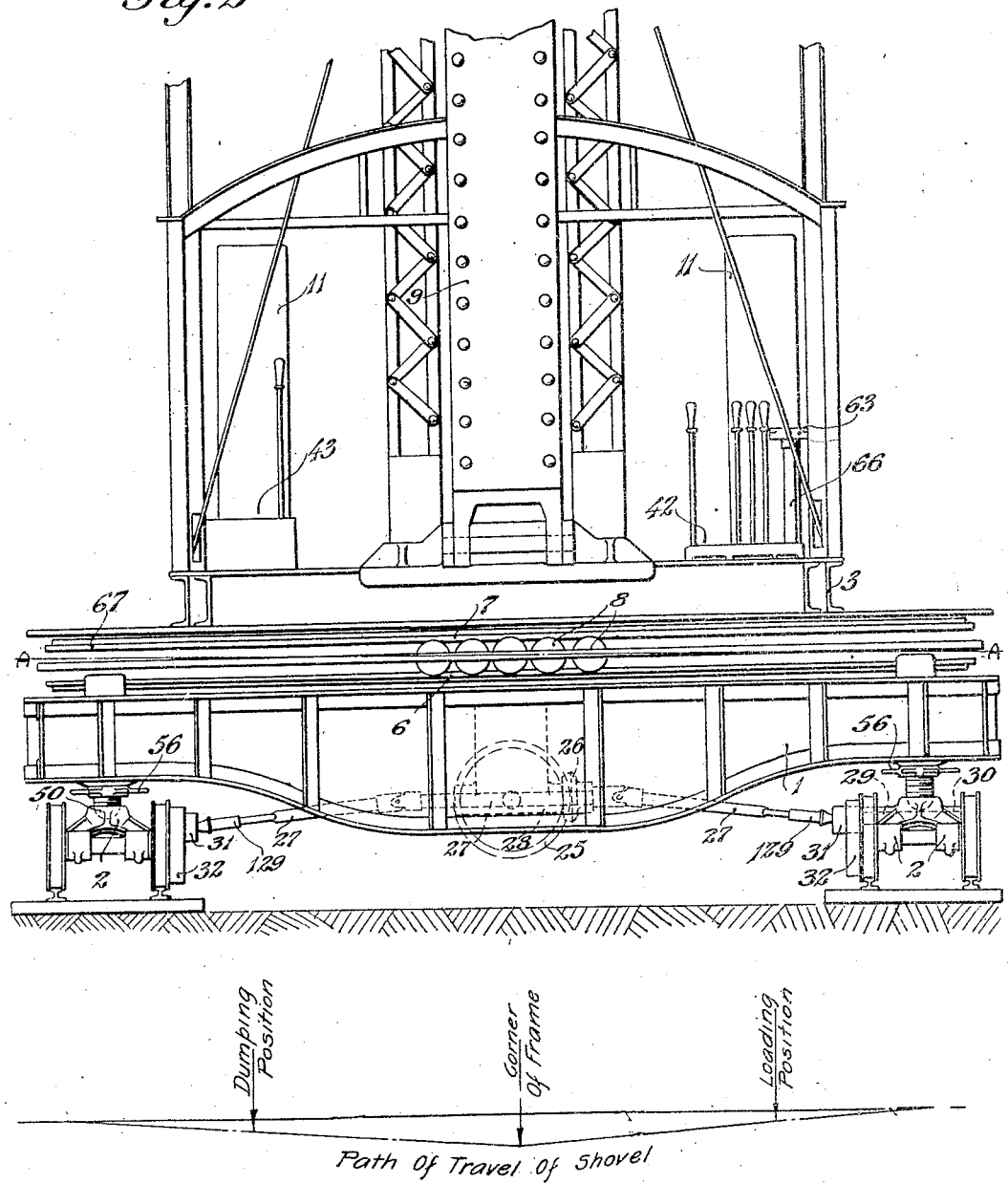

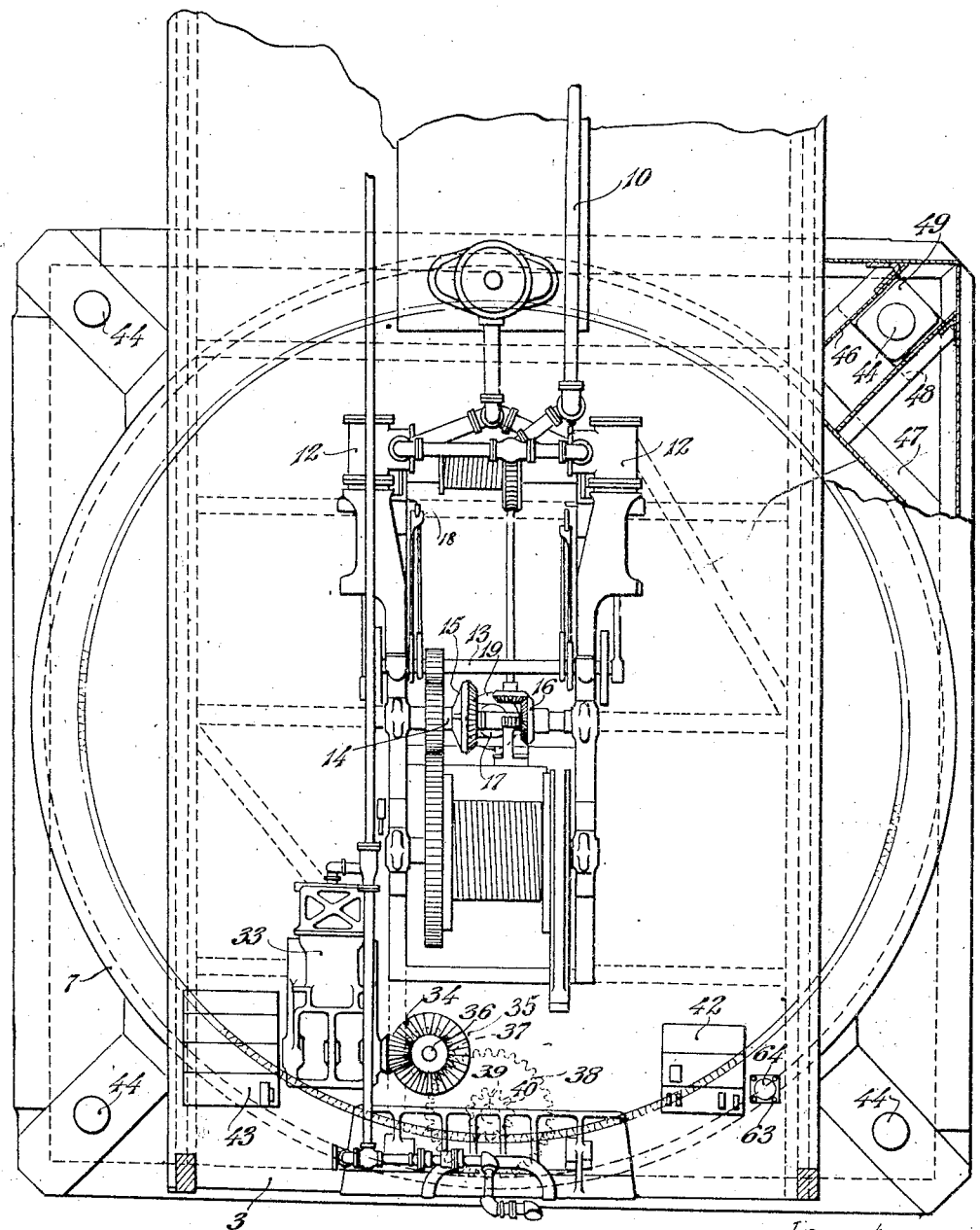

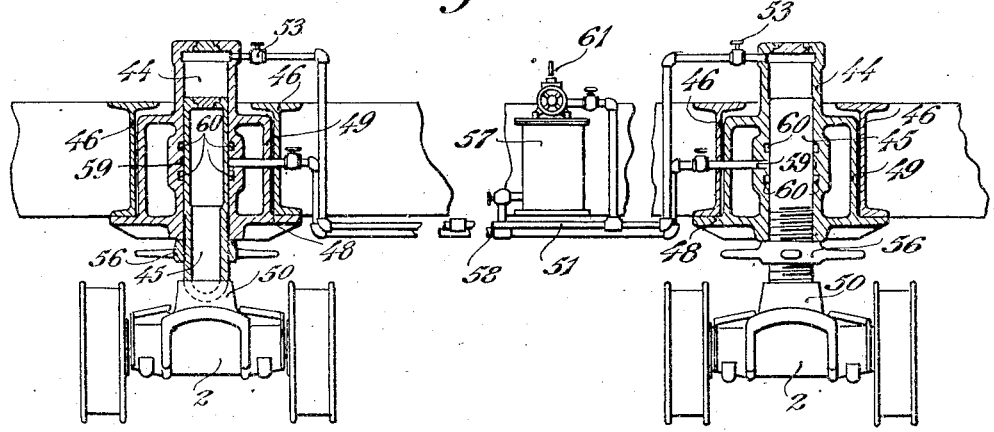
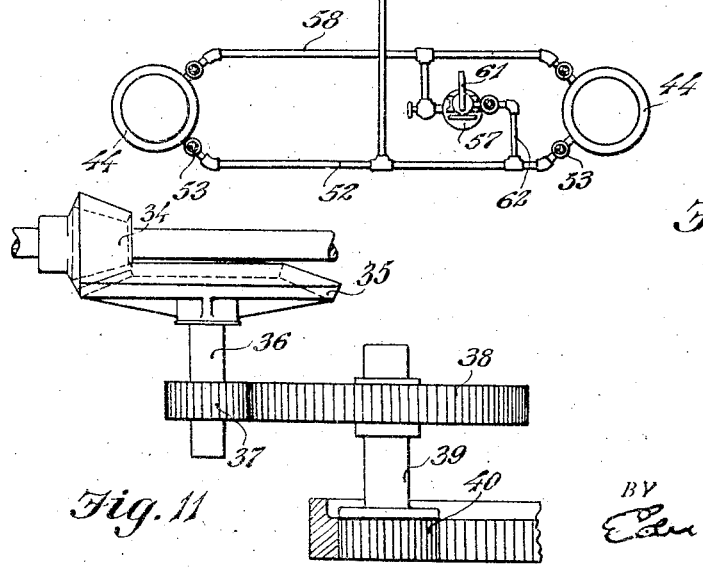
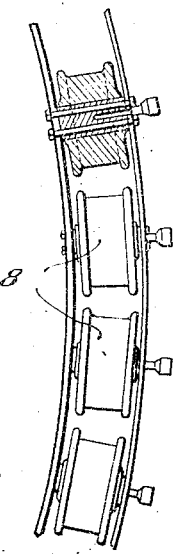

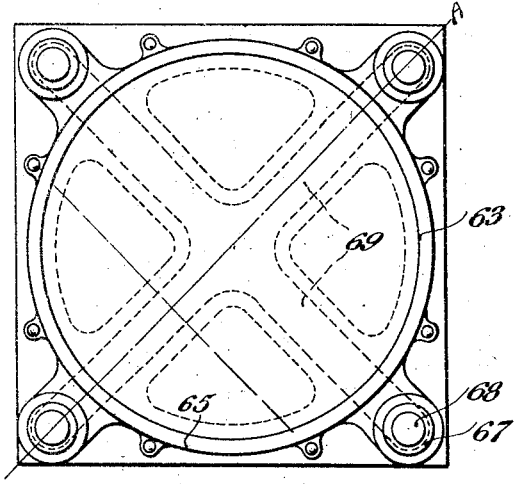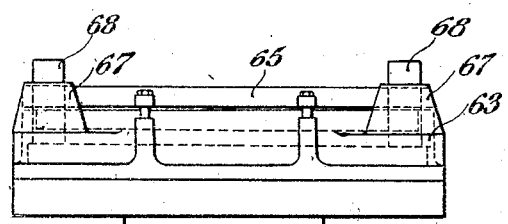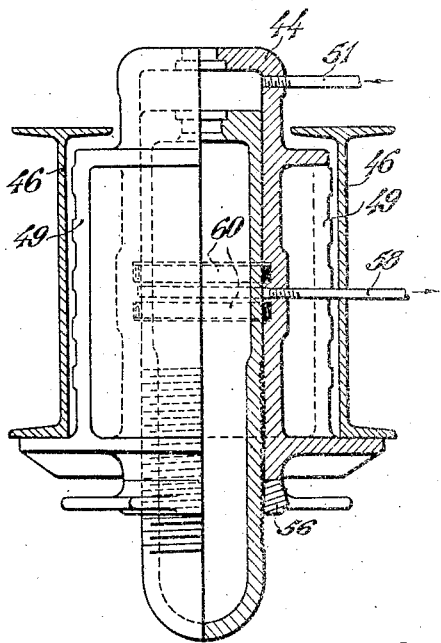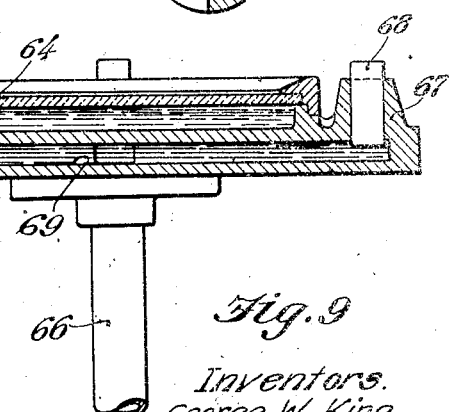

GEORGE W. KING, CHARLES B. KING, BENJAMIN JACOBY, AND HERBERT E. ROUSH, OF MARION, OHIO, AND GRANT HOLMES, OF DANVILLE, ILLINOIS, ASSIGNORS TO THE MARION STEAM SHOVEL COMPANY, OF MARION, OHIO, A CORPORATION OF OHIO.

EXCAVATING-MACHINE.

1,280,238.  Specification of Letters Patent.  Patented Oct. 1, 1918.

Application filed June 2, 1917. Serial No. 172,355.

*To all whom it may concern:*

Be it known that we, GEORGE W. KING, CHARLES B. KING, BENJAMIN JACOBY, and HERBERT E. ROUSH, citizens of the United States, residing at Marion, in the county of Marion and State of Ohio, and GRANT HOLMES, a citizen of the United States, residing at Danville, in the county of Vermilion and State of Illinois, have invented certain new and useful Improvements in Excavating-Machines, of which the following is a specification, reference being had therein to the accompanying drawings.

This invention relates to excavating machines and is in the nature of an improvement on the excavating machine of Patent No. 1,128,151 granted February 9, 1915, to Charles B. King, Grant Holmes, Benjamin Jacoby, and Herbert E. Roush.

While these machines may be used for excavating work of various kinds they are designed principally for stripping the overburden of earth and rock from deposits of coal and ore which lie close to the surface of the earth. After the overburden is removed the coal or ore is quarried and removed, usually by means of a power shovel. Such machines are necessarily of a very large and powerful construction and the present machine has a platform approximately 30 feet square, with a supporting truck at each corner, and has a boom 80 feet long which carries an 8 yard dipper. The supporting surface on which the machine rests, and over which it must travel as it is advanced from one position to another, is very uneven, and the problem of maintaining the platform level, or substantially so, is an important one. It is highly desirable that the construction should be such that the four corners of the platform can be adjusted relatively one to the other to bring them to the desired relative positions. In conveying a loaded dipper from the point of excavation to the dump the boom will swing across one corner of the supporting platform. If this corner happens to be a trifle high a very large amount of power is required to overcome the inertia of the loaded dipper and to move the same up the incline, resulting from the high corner over which the boom must move, and after it has passed the apex of the inclination it will gain momentum at it moves downward toward the dump and a considerable amount of power will be required to check its movement. After the load has been dumped the dipper must again be moved up one side of the inclination and its momentum overcome as it moves down the other side. By adjusting that corner of the platform over which the boom swings to a position a trifle lower than the other corners the loaded dipper will move down an inclination during the first portion of its movement and will acquire momentum which will assist very materially in carrying it up the opposed inclination leading to the dump, and before the dipper reaches the point of discharge its momentum will have been overcome. In this manner the power required to swing the boom may, in many cases, be reduced by as much as 50%.

The object of the invention is to provide an excavating machine of this kind in which the supporting platform may be readily adjusted to different positions relative to the horizontal; and further to provide such a machine in which any two corners of the platform may be adjusted relatively one to the other without altering the positions of the other corners thereof.

It is also an object of the invention to provide in combination with a machine capable of such adjustments, a device which will indicate to the operator, at his station on the machine, the exact position of the platform; and which will enable him to tell at a glance what adjustments are necessary to place the platform in the desired position. Other objects of the invention will appear as the mechanism is described in detail.

In the accompanying drawings Figure 1 is a side elevation partly broken away, of a rotary steam shovel embodying our invention; Fig. 2 is a front elevation, partly broken away, of the machine shown in Fig. 1; Fig. 2ª is a diagram showing the line of travel of the boom; Fig. 3 is a plan view of the rotating frame showing the arrangement of the power plant thereon; Fig. 4 is a detail view of two of the trucks, showing their equalizing devices in section; Fig. 5 is a plan view showing the connections between the several hydraulic jacks; Fig. 6 is a detail view of a section of the annular series of rollers on which the rotating frame rests; Fig. 7 is a plan view of the device for indicating the position of the rotating platform with respect to the horizontal; Fig. 8 is a side elevation of the device of Fig. 7; Fig. 9 is a sectional view taken centrally through the device of Fig. 7; and Fig. 10 is a detail view, partly in section, of one of the equalizing cylinders and its piston.

In the drawings we have illustrated one embodiment of our invention and have shown the same as applied to a rotary steam shovel, in which the platform carrying the excavating mechanism and the power plant is capable of a complete rotation, but it will be understood that this particular embodiment of the invention is shown for the purpose of illustration only and that many parts of the mechanism are useful with excavating machines of other types, and further that the excavating mechanism may be operated by any suitable power, the present type of shovel being manufactured and placed on the market with either steam or electrical power, at the option of the purchaser.

The machine here illustrated comprises a supporting platform, or base, 1, which is preferably rectangular in shape and which is here shown as square. This platform is supported at each of its four corners by trucks 2. These trucks may be of any suitable character, but in the present instance we have shown them as four-wheeled trucks having their wheels flanged to travel on rails, as these machines are commonly operated over two parallel tracks of railway rails, which are laid in advance of the machine as it is advanced from one position to another. Rotatably mounted on the supporting platform 1 is a second platform 3, which is here shown as a rectangular frame connected with the supporting platform by means of a center pin 4, which is secured to the supporting platform 1 and extends through a bearing 5 arranged centrally of the frame 3. The upper surface of the supporting platform and the lower surface of the rotating frame are provided with tracks 6 and 7, arranged concentrically of the center pin 4, and between which is arranged an annular series of rollers 8 which support the frame 3 and facilitate the rotation thereof. Mounted on the frame 3, at one end thereof, are the excavating devices which, in the present instance, comprise a boom 9 and an excavating dipper. The dipper and the larger portion of the boom are not shown, as these parts are of ordinary construction and do not form any part of the present invention. Mounted at that end of the frame 3 opposite the boom 9 is a steam generating plant 10, together with suitable water tanks 11. Arranged near the center of the frame 3 is a pair of steam engines 12 connected with a common engine shaft 13 which is geared to a counter shaft 14, on which are mounted two beveled gears 15 and 16, either of which may be connected with the shaft, for rotation therewith, by the manipulation of a clutch 17. The gear 16 is connected with the boom-hoist 18 and the gear 15 meshes with a beveled gear 19 secured to the upper end of a vertical propelling shaft 20, which extends through the center pin, the center pin being made hollow to receive the same. The lower end of the propelling shaft has secured thereto a beveled pinion 21 which meshes with beveled gears 22 carried by shafts 23 and 24, extending forwardly and rearwardly respectively, and having at their outer ends beveled gears 25 meshing with corresponding gears 26 on transverse shafts 27, which are journaled in suitable bearings 28 carried by adjacent portions of the platform 1. Each shaft 27 is preferably made up of a plurality of sections connected one to the other by universal joints, and the outer section 29, at each end of the shaft, is journaled in a bearing 30 formed in the frame of the adjacent truck 2, and has a sliding but nonrotatable connection with the adjacent section of the shaft, as shown at 129, to permit the shaft to accommodate itself to variations in the relative positions of the truck and the supporting platform, as will be hereinafter explained. Each section 29 of the shaft 27 has secured thereto a pinion 31 meshing with gears 32 carried by the inner wheels of the respective trucks.

Rotatory movement is imparted to the frame 3 by means of an engine 33 mounted near the forward end thereof and having its shaft provided with a pinion 34 meshing with a gear 35 near the upper end of a shaft 36 which is journaled in the frame 3 and has at its lower end a pinion 37 which meshes with a gear 38 on a shaft 39, to the lower end of which is secured a pinion 40 which meshes with an annular rack rigidly secured to the supporting platform 1. Hence by imparting movement to the train of gearing on the platform 3 the pinion can be caused to travel about the annular rack, and thus impart rotatory movement to the platform, this movement being under the control of an operator, or engineer who is stationed at 42, and controls all the engines with the exception of the crowding engine on the boom, which is controlled by the craneman, who is stationed at 43, both of the stations 42 and 43 being provided with levers, by means of which the several mechanisms are controlled.

Each of the four trucks 2 is vertically adjustable relatively to the supporting platform 1 and relatively to the other truck to enable the platform to be maintained in the desired position with respect to the horizontal, and the several trucks are connected one to the other by suitable equalizing devices by means of which the platform may be adjusted to maintain it in the desired position as the machine is advanced in the course of the work, and which are also of such a character as to permit any two corners of the platform to be adjusted relatively one to the other without affecting the position of the other corners of the platform.

In the present instance we have employed hydraulic equalizing mechanism and have shown each truck as connected with the platform by means of a hydraulic jack. Each of these jacks comprises a cylinder 44 mounted in the corner of the platform 1, and a piston 45 mounted in the cylinder and connected at its lower end with the truck. Each corner of the platform is provided with a frame to receive and support the cylinder of the jack for that corner of the platform. These frames each comprise a pair of I-beams, 46, arranged substantially radially of the platform and connected at their inner ends with a beam 47 extending diagonally of the platform and secured at its ends to the side members thereof. Each cylinder 44 has rigidly secured thereto, and preferably formed integral therewith, flanges 48 and spacing members 49 extending upwardly from said flanges and adapted to fit between the I-beams 46. The inner flanges are cut away at the lower edges of the I-beams to permit the insertion of the cylinder structure between the two I-beams, which then rest upon the flange 48 at the lower end of the structure, the whole being rigidly secured together and forming a very rigid connection between the cylinders and the supporting platform. The pistons 45 are preferably so connected with the trucks that the latter may have movement relatively thereto to accommodate themselves to irregularities in the supporting track and to this end the frame of each truck is provided with a socket 50, and the lower ends of the pistons are rounded to fit into these sockets. The cylinders, above the pistons, are filled with a fluid, preferably noncompressible, and the cylinders are connected in pairs so that the cylinders of each pair may have open communication one with the other. In the present instance the cylinders at the forward end of the platform are connected by a pipe 51 and the cylinders at the rear end of the platform are connected by a pipe 52. These pipes lead into the respective cylinders at the upper ends thereof and are provided with valves 53 to control the flow of fluid through the same. The cylinders of one pair are connected with the cylinders of the other pair by means of a pipe 54 connected at its ends with the pipes 51 and 52 between the valves therein and having a valve 55. By opening all the valves 53 and the valve 55 the four cylinders may be placed in open communication one with the other, or by closing a selected part only of the valves any one of the cylinders may be placed in communication with any other cylinder. In the operation of the device, assuming that the weight on the machine is substantially equally distributed, the equalizing operation of the several jacks will be automatic, within their range of operation. For example, if in advancing the machine one of the trucks encounters an elevation the piston of that truck will be forced upwardly in its cylinder and, all the valves being open, will force the fluid from that cylinder into the other cylinders. On the other hand, if one of the trucks encounters a depression in the track the truck will follow this depression and the piston will follow the truck, thus drawing into its cylinder fluid from the other cylinders and tending to lower all parts of the platform equally. In practice, however, it is not often that the weight is equally distributed upon the supporting platform and it is necessary that some positive means be employed to force the fluid from one cylinder to the other and thus effect the desired adjustment of the platform. When the dipper is empty the center of gravity is in the rear of the longitudinal center of the machine, hence the rear trucks carry the greatest part of the load. In advancing the machine under this condition the valve 55 may be closed, thus dividing the four cylinders into two pairs, a front pair and a rear pair, and if one of the front trucks encounters an elevation there will be no equalization between this truck and the rear truck, due to the passage of fluid from the front cylinder to the rear cylinder, but at the end of the movement of the machine, or at such other time as may be convenient, the desired equalization is accomplished either by the use of the pumps to force the fluid into the rear cylinders, or by opening valve 55 and revolving the frame to bring the greater weight above the high corner of the machine, thus forcing the fluid out of that cylinder into one or more of the other cylinders.

Should it be desirable to tilt the platform diagonally to bring it to the desired position, this may be done by connecting the diagonally opposite cylinders. For example, in case the boom were swinging across the right-hand forward corner of the platform it would be desirable to lower that corner of the platform slightly to utilize gravity in starting and stopping the boom, as has been heretofore explained. Therefore, the platform must be adjusted relatively to the trucks at the right-hand forward corner and the left-hand rear corner without altering its adjustment relative to the other trucks. To accomplish this the valves of the right-hand forward cylinder and the left-hand rear cylinder and the valve 55 are opened, while the valves at the right-hand rear cylinder and the left-hand forward cylinder are closed. By then bringing additional weight to bear upon the right-hand forward corner of the platform, as by moving the boom with the loaded dipper over that corner, the platform will be caused to turn about a line extending between the right-hand rear corner and the left-hand front corner, and the depression of the right-hand forward corner will force the fluid out of that cylinder into the cylinder at the left-hand rear corner, thus causing that corner of the platform to be elevated a distance corresponding to the depression of the diagonally opposite corner. The pistons and their trucks may be locked in their adjusted positions by closing the valves in the several pipes and thus preventing the flow of the fluid into and from the respective cylinders. We prefer, however, to provide a positive lock to hold the pistons in their adjusted positions, and to this end the lower portion of each piston is threaded, and has mounted thereon a nut 56, which may be screwed up against the lower end of the cylinder, thus locking the piston against upward movement relatively to the platform, and in making adjustments of the platform these nuts must be first loosened to provide for the necessary movement of the pistons. Each pair of cylinders at the front and rear ends of the platform, respectively, is provided with an oil receptacle 57 with which the cylinders of that pair are connected by means of pipes 58 leading into the respective cylinders and communicating with an annular groove 59, located between packing rings 60 in the cylinder. Any seepage of fluid about the pistons will escape through the grooves 59 and pipes 58 to the receptacle 57. This receptacle is also provided with a pump 61 by means of which fluid may be forced through a pipe 62 and the pipes 51 and 52 into the respective cylinders to replenish the cylinders when this may be necessary, and to maintain therein the desired quantity of fluid.

It is desirable that some mechanism should be provided which will coöperate with and be controlled by the position of the platform to indicate to the operator the position of the platform and which trucks must be adjusted, and what adjustment must be made thereof to restore the platform to the desired position. We have, therefore, provided an indicating device which is mounted on the platform adjacent to the engineer's station, and which comprises a shallow receptacle 63 adapted to contain a fluid, and having its upper wall of glass, as shown at 64, this glass being held in position by a clamping collar 65 having a circular opening through which the liquid in the receptacle may be viewed. This receptacle is mounted on a standard 66 in a position parallel with the platform. The fluid does not quite fill the receptacle and upon any tilting of the movable platform the fluid will flow away from one side of the receptacle and will form a chord-like line extending across the sight opening of the receptacle, and indicating the amount of inclination of the supporting platform and the exact direction of the inclination. That is, it will show which corner is low and which is high, and whether one corner only is low, or whether two corners are low. In order that the operator may more readily determine just which piston must be adjusted and the character of that adjustment, we have provided, in connection with the indicating device above described, a supplemental device, which, however, may, if desired, be used independently of the indicating device, and which comprises a rectangular frame having at each corner a socket 67 in which is slidably mounted a plug 68 which fits snugly within the socket, but is free to rise and fall therein. The several sockets are connected one to the other by diagonal passages 69 which are filled with fluid. The edges of the frame are arranged parallel with the edges of the rotating frame, and when this frame is in its normal position its lateral edges are parallel with the adjacent edges of the supporting platform and the edges of the indicator frame will be parallel with the edges of the supporting platform. When this platform is level each plunger will project from its socket the same distance. If the platform tilts toward one corner the fluid flowing toward that corner will cause the adjacent plunger to project a greater distance from its socket and the diagonally opposite plunger will follow the fluid into the socket and will thus project a lesser distance beyond the end thereof. The distances which the respective plungers project indicate the amount of adjustment necessary to be made with the respective trucks to restore the platform to its normal position, it being apparent that the greater the depression of the corner of the truck the greater the elevation of the plunger. The main indicating device and the supplemental device are preferably combined in a single structure and as here shown the sockets are formed in the corners of the frame constituting the receptacle 63 and the passage-ways 69 are formed beneath the receptacle.

The operation of the device will be readily understood from the foregoing description of the several parts thereof and it will be apparent that we have provided an excavating mechanism of the character described in which the several supporting trucks are connected by equalizing devices which will permit them to automatically adjust themselves to irregularities in the supporting tracks, and that these equalizing devices are of such a character that connections may be established between selected trucks to cause the relative adjustment thereof independently of the other trucks to cause the mechanism to assume a desired position, and that means are provided for locking the trucks in their adjusted positions with relation to the supporting platform to maintain the platform in the desired position for any desired length of time. And it will be apparent that by adjusting the platform to a selected position the operation of the excavating mechanism can be greatly facilitated and a large saving of power effected. Further, it will be apparent that the indicating devices will indicate to the operator the exact position of the platform and thus enable him to ascertain quickly the adjustment which must be made to place it in a desired position.

While we have shown and described one embodiment of our invention we wish it to be understood that we do not desire to be limited to the details of construction shown and described as various modifications will occur to a person skilled in the art.

Having now fully described our invention, what we claim as new and wish to secure by Letters Patent is:—

1. In a mechanism of the character described, the combination with a supporting platform, of trucks connected respectively with the four corners of said platform and capable of vertical adjustment relatively thereto, and equalizing connections between the several trucks, said connections being of such a character as to permit anyone of said trucks to be adjusted relatively to any other truck without disturbing the adjustment of the remaining trucks.

2. In a mechanism of the character described, the combination with a supporting platform, of trucks to support the four corners of said platform, hydraulic jacks connecting said trucks with said platform, connections between the several hydraulic jacks to permit the fluid to flow from one to the other when one of said trucks is moved relatively to the other, and means for so controlling the said connections as to enable any one of said trucks to be adjusted relatively to any other truck without disturbing the adjustment of the remaining trucks.

3. In a mechanism of the character described, the combination with a supporting platform and trucks to support the four corners of said platform, of a cylinder carried by each corner of said platform and containing a fluid, pistons mounted in the several cylinders and connected with the respective trucks, pipes connecting said cylinders in pairs to permit the fluid to flow from one cylinder to the other when the piston in one cylinder moves relatively to the piston in the other cylinder, a connection between said pipes, and valves for controlling the flow of fluid between the several cylinders.

4. In a mechanism of the character described, the combination with a supporting platform and trucks to support the respective corners of said platform, of a cylinder mounted in each corner of said platform and containing a fluid, a piston mounted in each of said cylinders and connected with the truck for that corner of said platform, a pipe connecting the cylinders at the forward end of said platform, a second pipe connecting the cylinders at the rear end of said platform, valves arranged in said pipes near each of said cylinders, and a pipe connected with each of said first-mentioned pipes between the valves therein.

5. In a mechanism of the character described, the combination with a supporting platform and a structure revolubly mounted on said supporting platform to carry propelling and excavating mechanisms, of trucks connected with the respective corners of said platform and capable of adjustment relatively thereto, and equalizing connections between said trucks to enable said platform to be tilted about an axis extending between diagonally opposite corners thereof to depress that corner of said truck over which said excavating mechanism is moved by the movement of said revoluble structure.

6. In a mechanism of the character described, the combination with a supporting platform and a structure revolubly mounted on said supporting platform to carry propelling and excavating mechanisms, of trucks connected with the respective corners of said platform and capable of adjustment relatively thereto, equalizing connections between said trucks to enable said platform to be tilted about an axis extending between diagonally opposite corners thereof to depress that corner of said truck over which said excavating mechanism is moved by the movement of said revoluble structure, and means for locking said trucks in their adjusted positions with relation to said platform.

7. In a mechanism of the character described, the combination with a supporting platform and a structure revolubly mounted on said supporting platform to carry propelling and excavating mechanisms, of trucks connected with the respective corners of said platform and capable of adjustment relatively thereto, and equalizing connections between diagonally opposite trucks to enable the diagonally opposite corners of said platform to be adjusted relatively one to the other.

8. In a mechanism of the character described, the combination with a supporting platform, a structure revolubly mounted on said platform to carry propelling and excavating mechanisms, and trucks to support the respective corners of said platform, of cylinders mounted in the corners of said platform and containing fluid, pistons mounted in said cylinders and connected with the respective trucks, and means to establish communication between the cylinders in diagonally opposite corners of said platform.

9. In a mechanism of the character described, the combination with a supporting platform, a structure revolubly mounted on said platform to carry propelling and excavating mechanisms, and trucks to support the four corners of said platform, of cylinders mounted in the corners of said platform and containing fluid, pistons mounted in said cylinders and connected with respective trucks, and means for connecting any one of said cylinders with a part or all of the other cylinders.

10. In a mechanism of the character described, the combination with a supporting platform and a structure revolubly mounted on said supporting platform to carry propelling and excavating mechanisms, trucks connected respectively with the four corners of said platform and capable of vertical adjustment relatively thereto, and equalizing connections between the several trucks, of a propelling shaft extending transversely of said machine and comprising a plurality of sections flexibly connected one to the other, the end sections of said shaft being rotatably mounted on the frames of the respective trucks and having geared connections with the wheels of said trucks, said end sections of said shaft being slidably connected with and held against rotation relatively to the adjacent inner sections of said shaft, and an operative connection between said propelling shaft and the propelling mechanism on said revoluble structure.

11. In a mechanism of the character described, the combination with a supporting platform and a structure revolubly mounted on said supporting platform to carry propelling and excavating mechanisms, trucks connected respectively with the four corners of said platform and capable of vertical adjustment relatively thereto, and equalizing connections between the several trucks, of propelling shafts extending transversely of said platform at the front and rear edges thereof, each of said shafts comprising a plurality of sections flexibly connected one with the other and having their outer sections rotatably mounted in the frames of the respective trucks and slidably connected with the adjacent inner sections, geared connections between said shafts and the wheels of said truck, other shafts extending lengthwise of said platform and having geared connections with said transverse shafts, a vertical shaft extending through said platform and said revoluble structure at the axis of the latter, and having geared connections with said longitudinal shafts, and an operative connection between said vertical shaft and the propelling devices on said revoluble structure.

12. In a mechanism of the character described, the combination with a supporting platform and trucks to support the respective corners of the platform, of a piston connected with each of said trucks, cylinders to receive said pistons, a supporting structure at each corner of said platform comprising inwardly extending flanged beams, spaced apart to receive one of said cylinders between them, said cylinders having parts to engage the flanges of said beams, and a diagonally arranged beam connected to the inner ends of said inwardly extending beams and to the side members of said platform.

13. In a mechanism of the character described, the combination with a supporting platform and trucks to support the respective corners of the platform, of pistons connected with the respective trucks, cylinders to receive the respective pistons, said cylinders having flanges near their lower ends, a pair of I-beams extending inwardly at each corner of said platform and spaced apart to receive said cylinders between them and to engage the flanges at the lower ends of said cylinders, and a diagonal frame member secured at its ends to the side walls of said platform and supporting the inner ends of said I-beams.

In testimony whereof, we affix our signatures hereto.

GEORGE W. KING.
CHARLES B. KING.
BENJAMIN JACOBY.
HERBERT E. ROUSH.
GRANT HOLMES.